United States Patent
Gupta et al.

(10) Patent No.: US 7,643,807 B2
(45) Date of Patent: Jan. 5, 2010

(54) METHODS FOR USING BROADCAST MEDIA CONTENT INFORMATION AND RELATED BROADCAST MEDIA RECEIVERS/PLAYBACK DEVICES

(75) Inventors: Vikram Makam Gupta, Raleigh, NC (US); Stephen Kight Forbes, Raleigh, NC (US); Gregory A. Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 671 days.

(21) Appl. No.: 11/300,972

(22) Filed: Dec. 15, 2005

(65) Prior Publication Data

US 2007/0143816 A1 Jun. 21, 2007

(51) Int. Cl.
*H04B 1/18* (2006.01)
(52) U.S. Cl. .............. 455/179.1; 455/150.1; 455/180.1; 455/185.1
(58) Field of Classification Search .............. 455/179.1, 455/150.1, 180.1, 185.1, 186.1, 3.01, 3.02, 455/3.04, 3.06, 130, 160.1, 161.1, 162.1, 455/158.1, 158.2, 158.4
See application file for complete search history.

(56) References Cited

U.S. PATENT DOCUMENTS

| | | | | |
|---|---|---|---|---|
| 5,583,873 | A | * | 12/1996 | Miyake et al. .............. 370/527 |
| 6,725,022 | B1 | * | 4/2004 | Clayton et al. ............ 455/154.1 |
| 7,412,202 | B2 | * | 8/2008 | Gutta et al. ................. 455/3.01 |
| 2001/0033343 | A1 | | 10/2001 | Yap et al. |
| 2003/0026344 | A1 | | 2/2003 | Rindsberg et al. |
| 2003/0088872 | A1 | | 5/2003 | Maissel et al. |
| 2004/0110522 | A1 | * | 6/2004 | Howard et al. .............. 455/512 |
| 2004/0181814 | A1 | | 9/2004 | Ellis et al. |
| 2004/0235442 | A1 | * | 11/2004 | Toporski .................. 455/166.1 |
| 2005/0102696 | A1 | | 5/2005 | Westberg |
| 2006/0058997 | A1 | * | 3/2006 | Wood .......................... 704/233 |
| 2006/0059535 | A1 | * | 3/2006 | D'Avello .................... 725/139 |

(Continued)

FOREIGN PATENT DOCUMENTS

EP 0 701 341 A1 8/1995

(Continued)

OTHER PUBLICATIONS

International Search Report and Written Opinion for PCT/US2006/030876; Aug. 6, 2007.

(Continued)

*Primary Examiner*—Pablo N Tran
(74) *Attorney, Agent, or Firm*—Myers Bigel Sibley & Sajovec

(57) ABSTRACT

Methods of displaying broadcast media content information to a user include receiving at a first receiver first content from a first channel of a multi-channel broadcast media system while receiving at a second receiver information regarding the content on a second off-channel of the multi-channel broadcast media system. Then, at least some of the received information regarding the content on the second channel is displayed to the user. A database of information may also be provided that includes, for example, information regarding listening/viewing preferences of the user. This database of information may be used, for example, to select the off-channels that are scanned for content information and/or to select what information is displayed to the user.

13 Claims, 8 Drawing Sheets

U.S. PATENT DOCUMENTS

2006/0292980 A1* 12/2006 Marcos Alba .............. 455/3.06
2007/0061215 A1* 3/2007 Waites ........................ 705/26

FOREIGN PATENT DOCUMENTS

| EP | 0 725 503 A1 | 12/1995 |
| EP | 1 022 873 A2 | 1/2000 |
| EP | 1 434 371 A2 | 12/2003 |
| EP | 1 536 580 A2 | 10/2004 |
| GB | 2 343 075 A | 4/2000 |
| WO | WO 93/18495 A1 | 9/1993 |
| WO | WO 99/65237 A1 | 12/1999 |
| WO | WO 02/084910 A1 | 10/2002 |

OTHER PUBLICATIONS

International Search Report PCT/US06/030876; date of mailing Mar. 21, 2007.

* cited by examiner

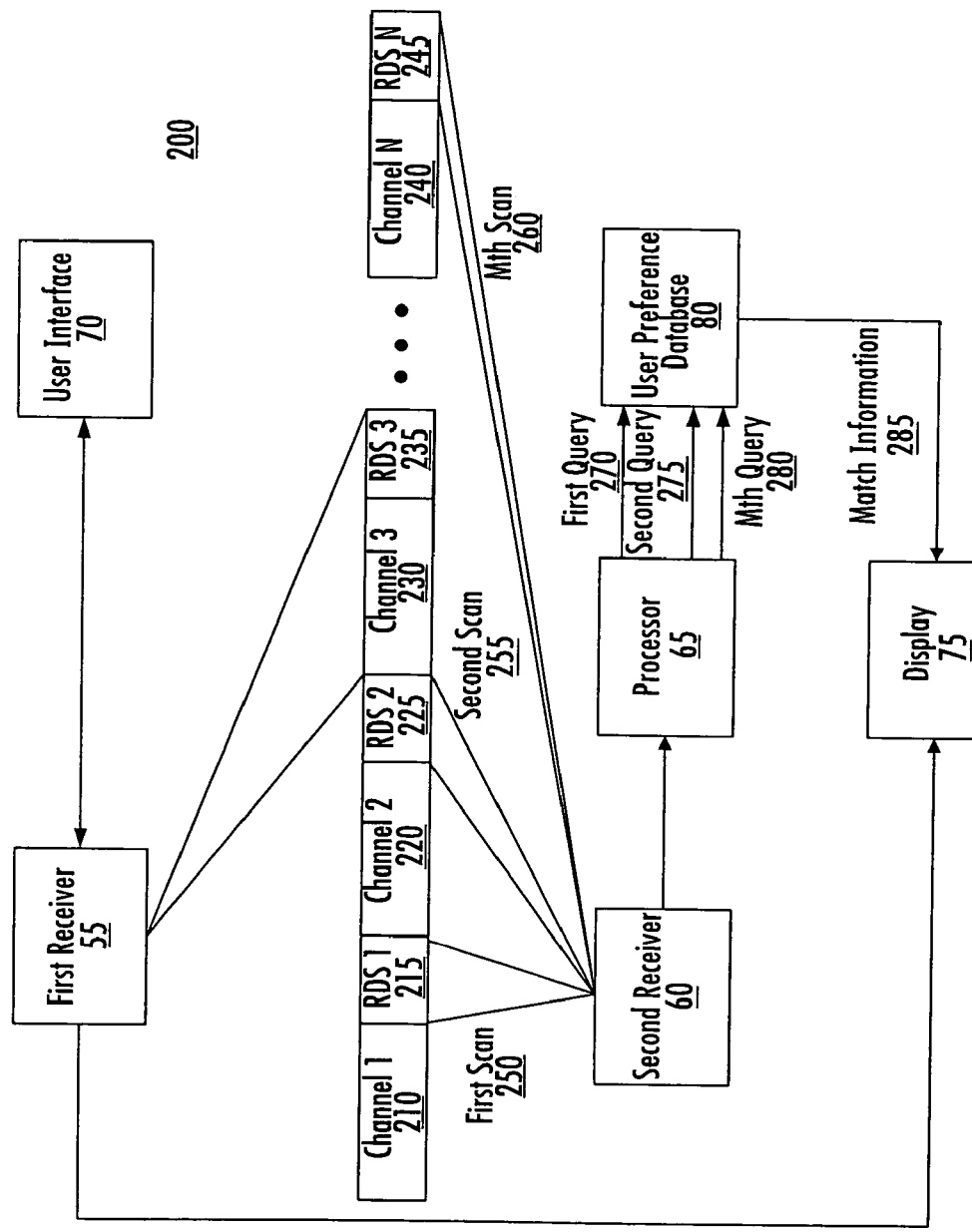

| User 1 Preferences 305 | | User 2 Preferences 330 | | User 3 Preferences 355 | |
|---|---|---|---|---|---|
| Song List 310 | Artist List 315 | Song List 335 | Artist List 340 | Song List 360 | Artist List 365 |
| Song 1 Title Song 2 Title ⋮ Song X Title | Artist 1 Name Artist 2 Name ⋮ Artist Y Name | Song 1 Title Song 2 Title ⋮ Song Q Title | Artist 1 Name Artist 2 Name Artist 3 Name | Song 1 Title Song 2 Title ⋮ Song R Title | Artist 1 Name Artist 2 Name ⋮ Artist S Name |
| Disfavored Song List 320 | Disfavored Artist List 325 | Disfavored Song List 345 | Disfavored Artist List 350 | Disfavored Song List 370 | Disfavored Artist List 375 |
| Song 1 Title Song 2 Title Song 3 Title | Artist 1 Name Artist 2 Name | Song 1 Title Song 2 Title Song 3 Title Song 4 Title Song 5 Title | Artist 1 Name | Song 1 Title Song 2 Title ⋮ Song Z Title | |

METHODS FOR USING BROADCAST MEDIA CONTENT INFORMATION AND RELATED BROADCAST MEDIA RECEIVERS/PLAYBACK DEVICES

FIELD OF THE INVENTION

The present invention relates to broadcast media systems and, more particularly, to methods and receiver/playback devices for broadcast media systems in which channel content information may be discerned.

BACKGROUND OF THE INVENTION

Numerous broadcast media systems exist in which a user can select to view, listen and/or otherwise receive content over one or more of a plurality of different channels. Broadcast media systems are known in the art as systems that transmit content on a plurality of different, defined, channels to users of the system at generally scheduled times, where each user generally receives the same information on the same channels as do other users of the system. Examples of broadcast media systems include broadcast television, broadcast AM and FM radio, cable and satellite television, satellite radio, internet radio, DVB-H, or other internet protocol broadcasts, etc. In some of these systems, such as cable and satellite television and satellite radio, users must subscribe to receive the broadcast content. In such subscription based systems, the number of channels available to the user may depend upon the particular plan or service agreement entered into between the user and the broadcast media system provider. In other broadcast media systems, such as AM radio, FM radio and broadcast television, all users of the system within a particular viewing/listening area receive the same channels, and the "system" comprises a plurality of independent stations that each broadcast programs on one or more defined channels of the system.

Herein, the programming information that is broadcast on a particular channel of a broadcast media system is referred to as the "content" of that channel. By way of example, the "content" broadcast on a channel of a traditional over-the-air FM radio broadcast system typically comprises music, talk shows, sports broadcasts, news and traffic reports, commercials and/or other programming. In some broadcast media systems, content descriptors or other content information may be embedded with, or transmitted alongside, the actual content. Herein, such broadcast content descriptors or other content information are referred to "as information regarding the content" on a channel and/or as "content identification data." By way of example, at least some of the channels of FM radio systems may transmit Radio Data System or "RDS" data, which is typically embedded in a sideband of the radio signal that broadcasts the content of the channel. This RDS data comprises textual information such as, for example, the name of the radio station, the title the performing artist and/or the genre of a song that is currently being (or about to be) played, program names, advertising information and/or other data. Appropriately equipped FM radio receivers can display this textual information to the user on a display screen. Typically, the RDS data is displayed on the display that is used to display the channel and other information to the user.

Receivers for broadcast media systems that include a plurality of different channels often provide the user a capability to "preset" or otherwise easily select a subset of preferred channels. By way of example, for many years, AM and FM radios have often included preset tuning buttons that allow a user to preset a half-dozen or so favorite channels and then tune into a particular one of the preset stations with a push of a single button. Similarly, television remote controls (and some radio receivers) often include an ability to scroll through a plurality of preset, preferred channels as opposed to separately entering the number for each channel.

SUMMARY

Pursuant to embodiments of the present invention, methods of displaying broadcast media content information to a user are provided. Pursuant to these methods, content from a first channel of a multi-channel broadcast media system may be received at a first receiver. Information regarding the content on each of a plurality of additional channels of the multi-channel broadcast media system may be received at a second receiver, where the plurality of additional channels comprise off-channels. At least some of the received information regarding the content on each of the plurality of additional channels may then be displayed to the user.

In some embodiments of these methods, the plurality of additional channels may be pre-selected by, for example, pre-selecting the channels of the multi-channel broadcast media system for which a pre-set tuning button has been set. The information regarding the content on each of the respective plurality of additional channels may be received serially (i.e., the information is received for one channel at a time). The method may also include comparing at least some of the information regarding the content on each of the plurality of additional channels with a database of information to identify ones of the plurality of additional channels having preferred content. In certain embodiments of these methods, one of the identified channels may be selected and the first receiver is automatically tuned to the selected channel.

In some embodiments of these methods, the first receiver may be an FM radio receiver and the information regarding the content on each of the plurality of additional channels may be RDS data. In other embodiments, the first receiver may be a television receiver. The information displayed may be limited to information regarding the content on channels that are identified as having preferred content.

Pursuant to further embodiments of the present invention, methods of classifying content on at least some of the channels of a multi-channel broadcast system are provided. Pursuant to these methods, first content is received at a first receiver from a first channel during a first time period. Information regarding the content available on a plurality of additional channels of the multi-channel broadcast media system is likewise received during the first time period and then automatically compared to a database of information associated with a user to classify at least some of the content available on the plurality of additional channels.

In certain embodiments of these methods, this classifying may involve identifying one of the plurality of additional channels as having preferred content of the user. In such embodiments, the method may also include automatically tuning the first receiver to the identified channel and/or automatically recording the content on the identified channel. The method may also include (1) playing the received first content, (2) determining that the first content is disfavored content (e.g., a commercial) and then (3) automatically tuning the first receiver to the channel identified as having preferred content.

In still other embodiments, these methods may include pre-selecting at least one channel of the plurality of additional channels. The first content is compared with the database of information associated with the user to identify the first content as disfavored content. The first receiver may be automatically tuned from the first channel to one of the pre-selected channels in response to identifying the first content as disfavored content.

Methods of operating a broadcast media receiver and playback device are also provided. Pursuant to some embodiments of these methods, first content from a first channel of a multi-channel broadcast media system may be received at the broadcast media receiver and playback device. Information regarding the content on a plurality of other channels of the multi-channel broadcast media system may also be received. A command to tune the receiver from the first channel to a different channel (e.g., a seek or scan command) is received. The channel that the broadcast media receiver and playback device tunes to in response to the received command may then be selected based at least in part on the received information regarding the content on the plurality of other channels of the multi-channel broadcast media system.

Pursuant to still further embodiments of the present invention, broadcast media receiver and playback devices are provided that include (1) a broadcast media player, (2) a first receiver that is configured to receive content over a first channel of a broadcast media system and to play the received content over the broadcast media player, (3) a second receiver that is configured to serially receive information regarding the content being broadcast on a plurality of additional channels of the broadcast media system, and (4) a user interface that includes a display that is configured to display at least some of the information regarding the content being broadcast on the plurality of additional channels. In some embodiments, the broadcast media receiver and playback device may also include a database of information regarding preferred content of a user of the broadcast media receiver and playback device. In such embodiments, the broadcast media receiver and playback device may also include a processor that is configured to compare the received information regarding the content being broadcast on the plurality of additional channels to the database of information regarding preferred content of the user.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 4 is a schematic diagram illustrating how first and second receivers may be used to implement methods according to embodiments of the present invention.

FIG. 5 is block diagram of a user preference database according to embodiments of the present invention.

DETAILED DESCRIPTION

Figure 1:
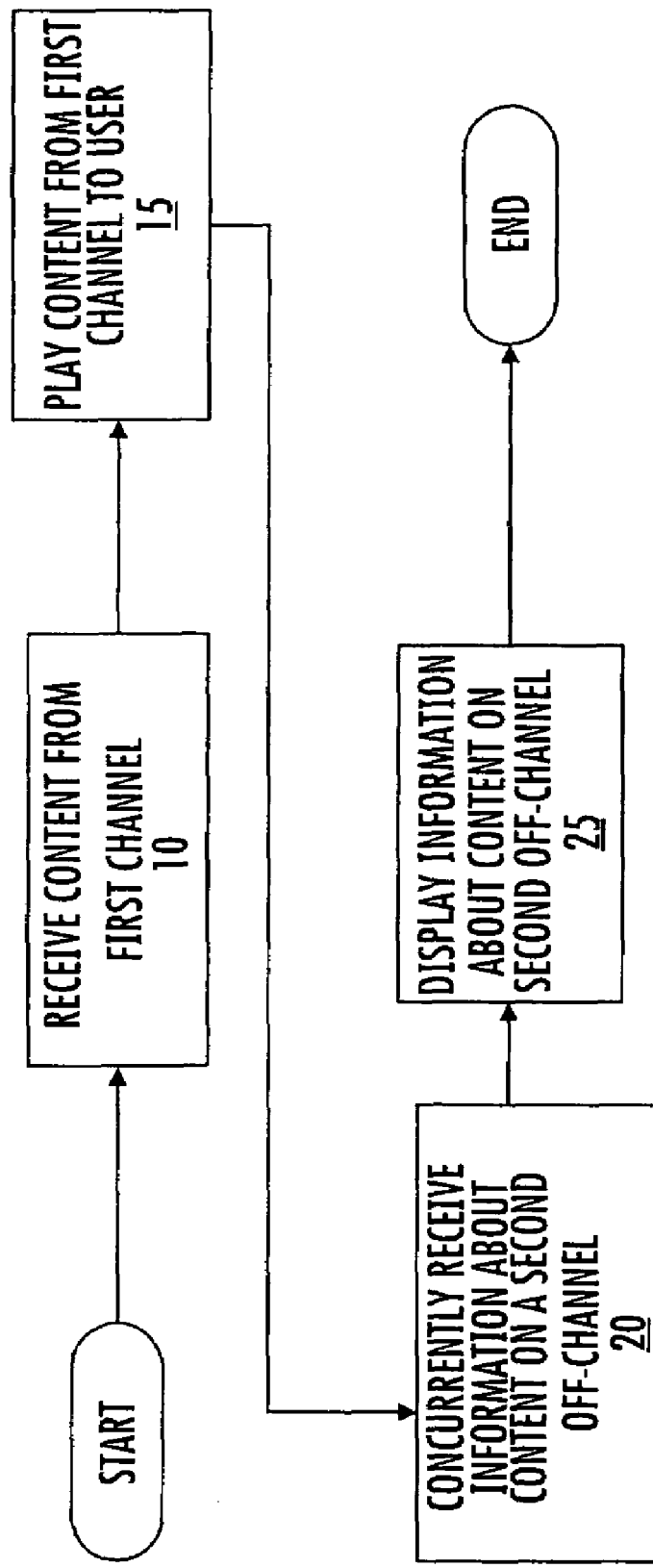
FIG. 1 is a flowchart illustrating methods of displaying broadcast media content information to a user according to certain embodiments of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

As will be appreciated by one of skill in the art, the present invention may be embodied as methods and as broadcast media receivers/players. It will also be appreciated that embodiments of the present invention may include both hardware and software components. The software components, if any, may take the form of one or more computer program products on a computer-usable storage medium having computer-usable program code embodied in the medium. Any suitable computer readable medium may be utilized and computer programming language may be used, both of which are generally known to those of skill in the art.

Certain embodiments of the present invention are described below with reference to flowchart illustrations and/or block diagrams. It will be understood that certain blocks of the flowchart illustrations and/or block diagrams, and combinations of blocks in the flowchart illustrations and/or block diagrams, can be implemented in whole or part by computer program instructions. These computer program instructions may be provided to a processor to produce a machine, such that the instructions, which execute via the processor create means for implementing the functions/acts specified in the flowchart and/or block diagram block or blocks. It will also be appreciated that the steps or acts specified in two or more blocks of these flowchart diagrams may, in some instances, be combined, and that in other instances the steps or acts specified in a particular block may be subdivided into multiple blocks. It will also be understood that in further embodiments of the present invention not specified in the flowchart and block diagrams, the steps/acts may be performed in different orders, certain steps and/or components may be omitted, and/or additional steps and/or components may be included.

Pursuant to some embodiments of the present invention, methods for displaying broadcast media content information are provided. Pursuant to further embodiments of the present invention, methods of identifying preferred broadcast media content to a user are provided. In still other embodiments of the present invention, enhanced broadcast media receiver and playback devices are provided. As explained below, these methods and devices according to embodiments of the present invention may enhance, for example, a user's broadcast media listening and/or viewing experience.

Most consumers have access to numerous different broadcast media systems, such as various types of television and radio. Such broadcast media systems often include dozens or even hundreds of channels, each of which typically broadcast different content. Most devices used to receive and play the broadcasts, such as televisions and radios, only receive and play to a user the content on a single channel. However, some devices, such as television receivers that include "picture-in-a-picture" ("PIP") capability, can simultaneously receive and display to a user the content on two or more channels.

A user receiving content from a particular broadcast media system may have interest in the content on more than one channel of the system. By way of example, FM radio listeners typically switch throughout the day between two, three, a half-dozen or even more FM radio channels, where programming broadcast by a particular radio station is transmitted on each of these different channels. With some types of broadcast media such as, for example, most television broadcast systems, printed or electronic schedules are often distributed that allow a user to know in advance what content will be playing on each of the channels of the broadcast media system. Such schedules include the television guides that are often printed in local newspapers that list the content that will be playing throughout the day or week on over-the-air broadcast, cable and/or satellite television broadcast media systems. Likewise, many television broadcast media systems include a channel, such as the "TV Guide" channel, that scrolls through or lists scheduling information. Radio stations also may publish general format guides that indicate the type of music/programming that the station will play during specified time slots and/or on specified days. However, in many instances, users of the broadcast media systems (and particularly mobile users) may not have access to such schedules, or viewing the schedules may be inconvenient. In addition, in many instances the schedules may not provide sufficient information for a user (e.g., the schedule may not identify the particular song that is being played on a radio station at a given moment, or indicate whether a commercial is playing on a particular television channel). Thus, a user may remain viewing and/or listening to a particular channel (the "on-channel") of a broadcast media system even though more preferred content is presently being broadcast (or about to be broadcast) on another channel (an "off-channel") because the user is unaware that the other content is currently available. As suggested by the preceding sentence, herein, a channel is referred to as an "on-channel" if the content of that channel is presently being provided to a user, while the remaining channels on the broadcast media system, whose content is not being provided to the user, are each referred to as an "off-channel."

Certain embodiments of the present invention will now be described with reference to FIGS. 1 and 2. As shown in FIG. 1, pursuant to certain embodiments of the present invention, methods for displaying broadcast media content information to a user are provided. Pursuant to these methods, content from a first channel of the broadcast media system (e.g., the programming on Channel 5 of a cable television system) is received (block 10). This content may be received at a first receiver of a broadcast media receiver and playback device (i.e., a device that receives broadcast media content and plays the content to a user) such as a television or an AM/FM radio. The content received from the first channel may also be played to the user (block 15), although in certain embodiments of the present invention this need not occur such as, for example, embodiments of the present invention discussed below in which the content information of channels of a broadcast media system are monitored for purposes of recording certain content when it is detected that the content is playing on one of the channels of the system. Concurrently with receiving the content on the first channel of the broadcast media system, information regarding the content on a second, off-channel (i.e., a channel for which content is not being played to the user) of the broadcast media system is received (block 20). This content may be received at a second receiver of the device. Finally, at least some of the information regarding the content on the second channel is displayed to the user (block 25).

Figure 2:
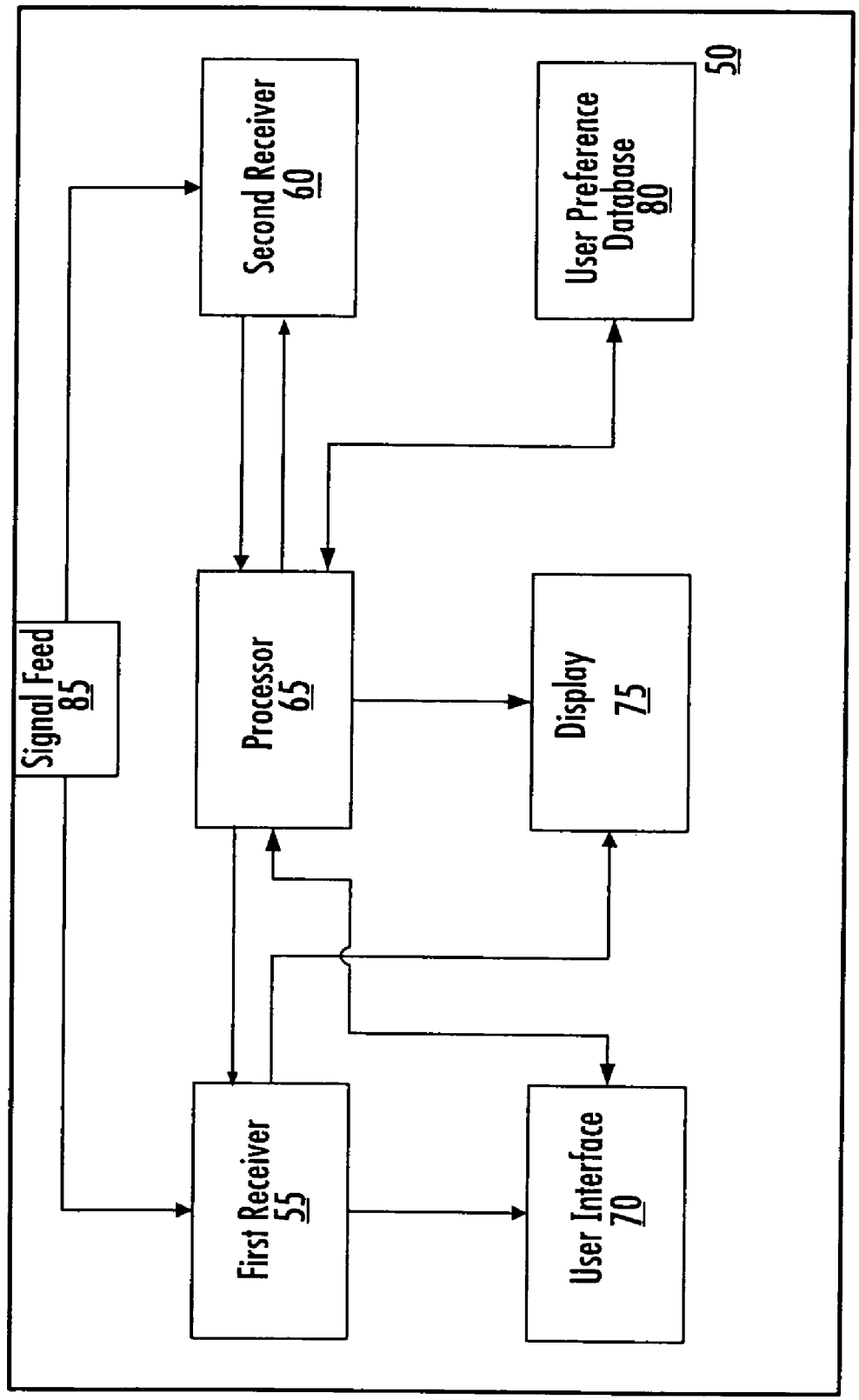
FIG. 2 is a block diagram of a broadcast media receiver and playback device according to embodiments of the present invention.

FIG. 2 is a block diagram of a broadcast media receiver and playback device 50 according to certain embodiments of the present invention. As shown in FIG. 2, the broadcast media receiver and playback device 50 includes a first receiver 55 and a second receiver 60. The first receiver 55 may be used to receive content from a first channel of the broadcast media system that is to be played to the user and/or recorded. The first receiver 55 may, in some embodiments of the present invention, have the capability to also receive a second broadcast signal that includes information regarding the content of the first channel. By way of example, in an embodiment of the invention that is configured to work in an FM radio broadcast system, the first receiver 55 may comprise an FM radio ASIC such as the TEA5761 ASIC manufactured by Phillips that features both a FM radio receiver that receives the FM signal carrying the content on the channel to which the receiver is tuned and an integrated RDS decoder that is designed to recover RDS data from the 57 kHz sideband of the demodulated FM signal.

As is also shown in FIG. 2, the broadcast media receiver and playback device 50 further includes a second receiver 60. In the embodiment shown in FIG. 2, the second receiver 60 receives its input signal directly from signal feed 85 (the signal feed 85 may comprise for example, an antenna, a cable television feed, etc.). However, it will be appreciated that other embodiments are possible. The second receiver 60 may comprise a full-function receiver that is capable of receiving both the content of one of the channels of the broadcast media system as well as the information regarding the content of the channel, or may be a stripped down receiver that only includes capabilities for receiving information regarding the content of a channel (e.g., an RDS decoder). It will be appreciated that the first and second receivers 55, 60 may be implemented in a single device in some embodiments of the present invention.

The broadcast media receiver and playback device 50 may further include a processor 65. The processor 65 may perform one or more of a variety of different functions. The processor 65 may, for example, control operation of one or both of the first receiver 55 and/or the second receiver 60. The processor 65 may also receive information regarding the content of a channel from the second receiver 60, and may perform processing on this information to put it in a form suitable to be displayed to the user and/or suitable to be used to send a query to the user preferences database 80 (discussed below). By way of example, RDS data need not be formatted in any particular fashion. Accordingly, the title and artist information included in the RDS data may be inserted between other information, such as the name of the station, the frequency of the channel, advertising information, etc. In certain embodiments of the present invention, the processor 65 may execute algorithms that parse this data to extract, for example, the title and artist information or to remove irrelevant information. Even in broadcast media systems in which the information regarding the content is placed in defined fields or otherwise well-designated, the processor 65 may be used to extract selected portions of the information that will be displayed and/or used in database searches that are discussed herein.

The broadcast media receiver and playback device 50 may also include a user interface 70. This user interface 70 may include, for example, tuning or channel buttons that a user may use to select a channel that is to be played, picture tubes, LCD screens, organic LED (OLED) displays, plasma screens, speakers, vibrators, soft keys, and/or other output devices that are used to play the content of a channel to the user, and/or various control buttons that may be used to control other aspects of the broadcast media receiver and playback device 50. The user interface 70 may further include a display 75 which may be used to display information regarding the content of one or more off-channels (and perhaps the on-channel or channels as well). While the display 75 is part of the "user interface" 70 in that the display 75 passes information from the device 50 to a user, in FIG. 2 the display 75 is shown as a separate feature to further clarify the functionality of one particular embodiment of the present invention. A single display may be used (which may or may not be divided into multiple windows) to provide the actual content of one or more channels of the broadcast media system and the information regarding the content of one or more off-channels to the user. In other embodiments, multiple displays may be used.

Finally, the broadcast media receiver and playback device 50 may also (optionally) include a user preference database 80. As discussed herein, this database 80 may be used to identify broadcast media content that is playing on one or more off-channels that may be of particular interest to a user. Herein, when content identification data is found to match entries in the user preference database 80 (except for entries in fields of the database 80 listing disfavored content), the content associated with the content identification data is referred to as "preferred content."

Figure 3:
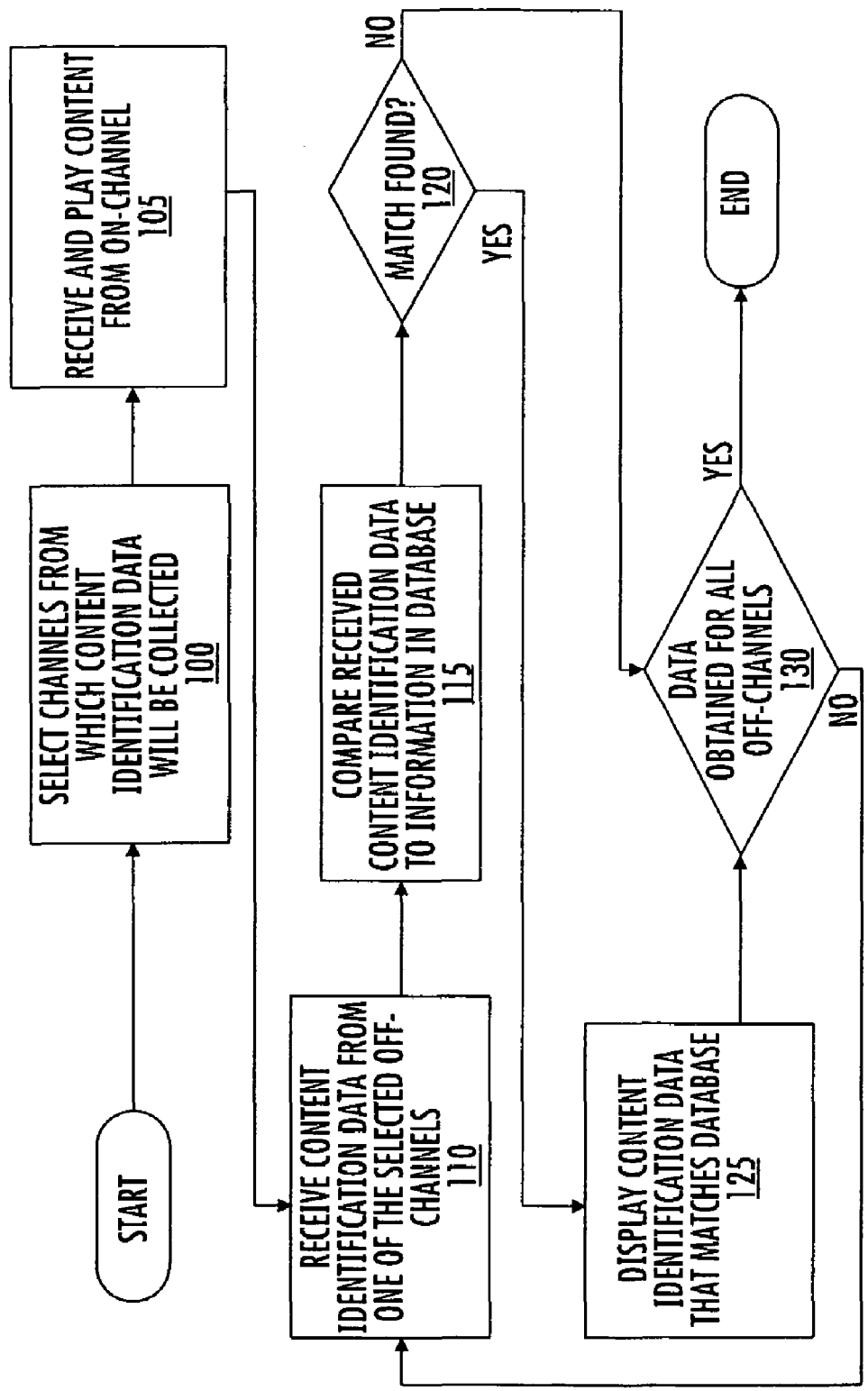
FIG. 3 is a flowchart illustrating further methods of displaying broadcast media content information to a user according to certain embodiments of the present invention.

FIG. 3 is a flowchart illustrating further methods of displaying broadcast media content information to a user according to certain embodiments of the present invention. As shown in FIG. 3, a user may pre-select channels from which information regarding the content of an off-channel of the broadcast media system (such as, for example, RDS data with respect to an FM radio system) will be collected (block 100). The content of a first channel (the on-channel) of the broadcast media system is then received, which may be played to the user (block 105). Concurrently with receiving the content of the first channel, information regarding the content playing on one or more of the pre-selected channels is received (block 110). This information may then be compared to information in a database that stores information regarding the user's content preferences (block 115), such as the user preference database 80 discussed above. If a match is found (block 120) (i.e., if the content identification data obtained at block 110 matches data entries of preferred content stored in the database 80), the content identification data may be displayed to the user or otherwise brought to the user's attention (block 125). If, no match is found (block 120), a determination is made as to whether content identification data has been received for each of the pre-selected channels (or alternatively, each of the pre-selected channels that are off-channels). If not (block 130), operations return to block 110 where the content identification data for the next of the pre-selected channels is received. If so (block 130), operations may end (until again requested). It will be appreciated, however, that the operations following block 100 of FIG. 3 may be continually performed such that the content identifier information is scanned in, for example, a round-robin fashion.

In some embodiments of the present invention, the broadcast media system is a broadcast FM radio system in which at least some of the channels broadcast text-based RDS data in addition to the normal FM radio broadcast (i.e., the normal content). FM radio receivers may be provided that include both (1) a primary receiver that receives the content on the channel to which the receiver is tuned and that optionally also receives RDS data for that channel and (2) one or more secondary RDS receivers that receive RDS data from channels other than the channel to which the user is listening. The content received by the primary radio receiver may be played to the user and/or recorded. The received "off-channel" RDS data may also be displayed to the user via a user interface. The user may also or alternatively use this off-channel RDS data to make more informed decisions regarding when to tune the primary radio receiver to another channel.

The secondary radio receiver that is used to receive RDS data may be a full function FM radio receiver that is capable of receiving both the content broadcast on FM channels and the associated RDS data, or may be a stripped down receiver that is only capable of receiving the RDS data. The RDS data received from the one or more off-channels may be provided to the user. By way of example, some or all of the RDS data for one or more off-channels may be displayed on a screen or other display on the FM radio. The data displayed may, for example, include the name of the song playing on one or more off-channels, the artists who recorded such songs, the name or title of any programming being broadcast on specific off-channels (e.g., the name of a show or the teams involved in a sports broadcast) or other information. The user may easily scan the displayed RDS data to determine whether or not to switch channels without having to press any buttons and without having to interrupt receipt of the on-channel broadcast.

In one specific embodiment of the present invention, the FM radio includes a primary receiver which receives the FM signal broadcast over the on-channel (and which may also receive RDS data for the on-channel), and a secondary receiver that is used to receive RDS data for a selected plurality of off-channels. The secondary receiver is programmed to serially scan through a plurality of off-channels, receiving and demodulating the RDS data for each such channel in a round-robin fashion. In many cases, it may be possible to lock onto, receive and demodulate the RDS signal for a particular channel very quickly. Accordingly, even if a relatively large number of off-channels are to be scanned (e.g., 12) for RDS data, the user may be provided with almost instantaneous updates as the programming changes on those channels, while only adding one additional receiver to the FM radio. It will be appreciated, however, that even faster response times may be achieved by adding more than one additional receiver.

As noted above with respect to FIG. 3, in certain embodiments of the present invention, the user may pre-select which off-channels are scanned (herein, the term "scan" refers to the process of tuning a receiver to a different channel and then receiving information from that channel) to collect content information. In some embodiments of the present invention, a user may individually pre-select each channel for which content information is obtained. In the FM radio example provided above, this might be accomplished, for example, by the user entering the frequency for each channel for which the user wants RDS data to be collected. In alternative embodiments, the FM radio may collect RDS data for each channel for which a pre-set tuning button has been assigned. In still further embodiments, RDS data may be obtained for each and every off-channel or for each and every channel. In still other embodiments, RDS data may be collected for all preset channels having a received signal strength that is greater than a predetermined value, or for all channels having a received signal strength that is greater than a predetermined value. Multiple constraints may be used, such as, for example, all channels (or all presets) having a received signal strength that is greater than a predetermined value for a specified period of time. Still other embodiments may collect RDS data for all channels having a received signal strength that is increasing (this may be useful, for example, for mobile users who are entering a new area). Other permutations are likewise possible.

In many situations, the current on-channel may be one of the channels that the user has pre-selected as a channel for which RDS data is to be obtained. In some embodiments of the present invention, the second receiver will not scan the on-channel for RDS data, even though it may be one of the pre-selected channels, in order to increase the scan speed and/or to simplify the display of off-channel information.

Figure 8:
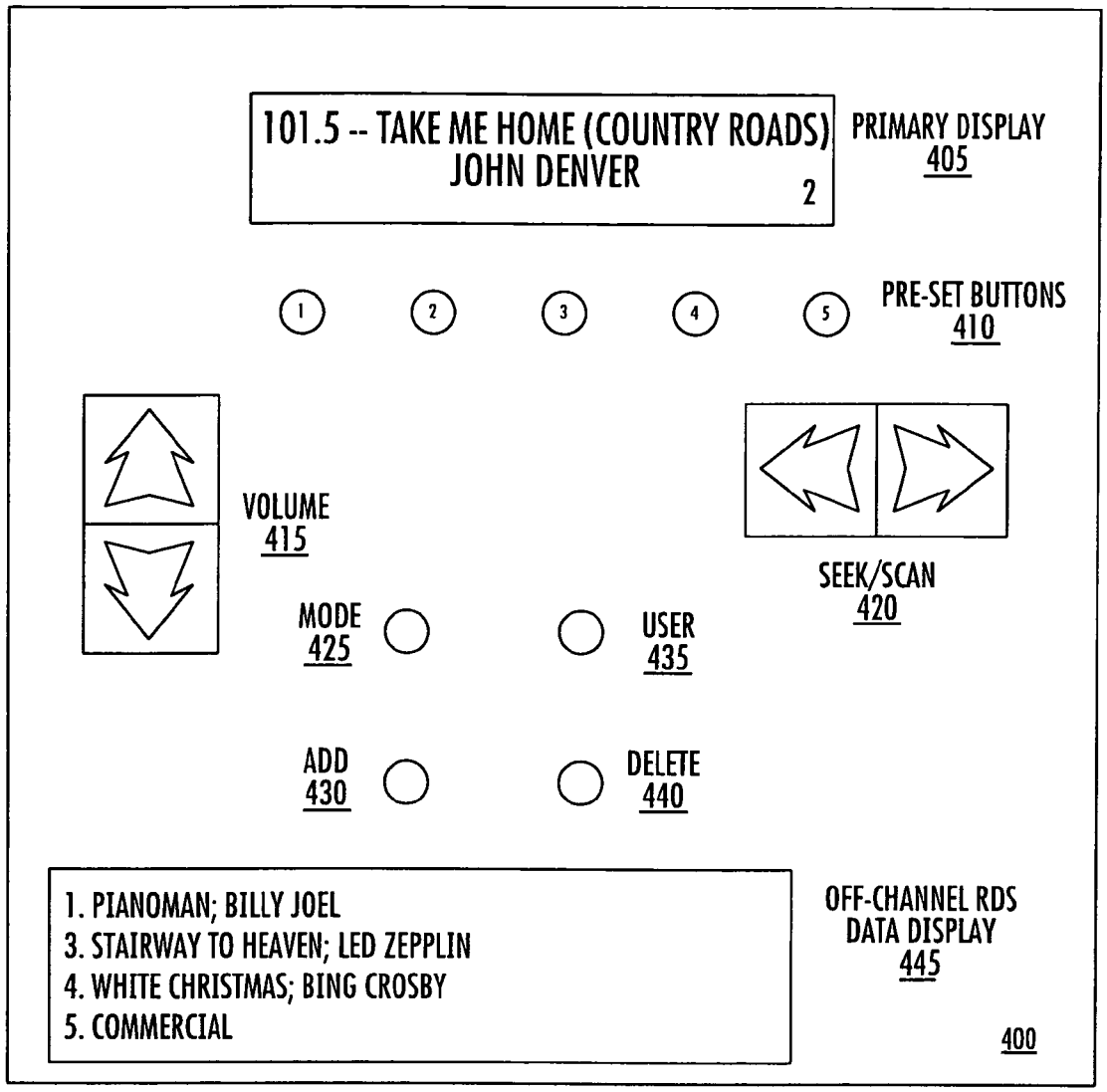
FIG. 8 is schematic diagram of a user interface for an FM radio receiver according to embodiments of the present invention.

As noted above, the off-channel content identification data may be provided to the user. In certain embodiments of the present invention, this data is presented as text data on a display screen. One embodiment of such a display is depicted in FIG. 8, which depicts an FM radio receiver display according to embodiments of the present invention that includes an off-channel RDS data display 445. As shown in FIG. 8, the display lists, for pre-set tuning buttons 1, 3, 4 and 5, the title and artist of the song that is currently playing. With respect to pre-set button 5, the display 445 lists that a commercial is playing. As discussed above, the RDS data for the on-channel (in this example, the on-channel corresponds to pre-set tuning button 2) may or may not be displayed. Moreover, if RDS data for the on-channel is included, it may be in a separate display (as in this case, where the information is provided in primary display 405) or in the same display 445 as the off-channel RDS data. In embodiments where all of the RDS data is displayed together, the on-channel RDS data may be highlighted in some fashion (e.g., by making it brighter or bolder, depicting it in a different color, using a different type face, etc.) so that a user can quickly and easily distinguish the on-channel data from the off-channel data.

In some situations, due to limitations based on the size of the display and/or the number of off-channels scanned for RDS data, it may not be possible and/or convenient to display all of the off-channel RDS data simultaneously. In such situations, the off-channel RDS data may be scrolled onto the display serially or in groups. For example, if the display has sufficient room to display 4 channels of off-channel RDS data at a time, and the radio is receiving and tracking eight channels of off-channel RDS data, the display could be updated periodically (e.g., every 3 seconds) to scroll one of the eight channels off the display while adding one of the un-displayed channels. Alternatively, the display could be updated periodically to replace the RDS data for the first four off-channels with the RDS data for the four un-displayed off channels. Other display schemes are also possible, and the present invention is not limited to any particular display scheme.

In still other embodiments of the present invention, the off-channel RDS data may only be displayed when it is detected that the programming on one of the off-channels that is being monitored has changed. By way of example, when serially scanning the RDS data for a series of pre-selected off-channels, the FM radio will periodically detect that the RDS data for one or more of the channels has changed since the time of the last scan. When this occurs, the user may be provided an audio, visual or other notification regarding this change. By way of example, upon detecting that the RDS data has changed for one of the pre-selected channels that is being monitored for RDS data, the radio may display information regarding the newly introduced programming that is extracted from the RDS data (e.g., the title and artist of a new song) on a display, along with some identification of the channel on which the new song is playing (e.g., the name or frequency of the channel, or the number of a pre-set tuning button that is set to the channel, etc.). This information may remain on the display for a limited amount of time (e.g., 5-10 seconds), and then be removed. When displayed, the information may be highlighted in some fashion (large or bold letters, different color font, blinking letters, associated audio alert, etc.) in order to catch the user's attention. In certain embodiments of the present invention, the limited amount of time is less than about 50% of the time that the content is played on the off-channel (i.e., less than about 50% of the time for which the RDS data is transmitted before the RDS data is changed, indicating that different content is playing).

Pursuant to still further embodiments of the present invention, it is possible to use a database of information regarding a user's broadcast media preferences to further optimize a user's viewing and/or listening experience. In particular, information in this database may be combined with received off-channel content information data to identify and highlight to a user off-channel programming that may be of particular interest to the user. By way of example, in the FM radio scenario discussed above, the RDS data may include names of particular artists and/or songs. The user preference database may include listings of songs, artists, sports teams, programs etc. in which the user is interested. The FM radio may include a processor that compares information in the user preference database with the received off-channel RDS data to identify currently-playing off-channel content that match entries in the database. When such information is identified, the user interface may somehow highlight this particular content or otherwise notify the user that preferred content is currently playing on an off-channel. For example, the RDS data associated with the preferred content that may be highlighted or emphasized in some fashion on the display, an audible signal or alarm may be sounded, etc. As discussed in more detail herein, the user preference database may be adapted based on a user's selections.

In other embodiments of the present invention, only off-channel RDS data that is identified as likely being of particular interest to the user is displayed. Such embodiments of the present invention will typically include significantly less information in the display area, which may make it easier for a user to identify situations in which they may choose to switch to an off-channel broadcast. This information may be displayed for the majority of the time that the content is being played on the off-channel at issue, or for a limited period of time at or near the time that new content is detected on the off-channel at issue. In some embodiments, the user may select between one or more of the above-described (or other) display modes.

FIG. 4 is a schematic diagram illustrating how first and second receivers may be used to implement methods in one specific FM radio 200 of the present invention. As shown in FIG. 4, a first receiver 55 receives both the content 230 and the RDS data 235 of one channel (here Channel "3", which may correspond to a particular frequency side-band) in the FM frequency band. The first receiver 55 outputs the received content to a user interface 70. While in the embodiment depicted in FIG. 4 the content is directly coupled from the first receiver 55 to the user interface 70 (which may include, for example, one or two speakers), it will likewise be appreciated that the content may be provided to the user interface 70 via a processor 65 and/or additional components of the FM radio 200. As is also shown in FIG. 4, the first receiver 55 may also be coupled to a display 75 that may be used to display some or all of the RDS data 235 received by the first receiver 55.

A second receiver 60 is also provided. As shown in FIG. 4, the second receiver 60 may perform a series of serially scans 250, 255, 260 to serially receive the RDS data 215, 225, 245 on some (or in the case depicted in FIG. 4, all) of the off-channels. The second receiver 60 may provide the received RDS data 215, 225, 245 to the processor 65. The processor 65 may generate a series of queries 270, 275, 280 that correspond to respective of the RDS data 215, 225, 245. By way of example, the processor 65 may extract portions of the RDS data by taking information from certain fields, if any, in the RDS data and/or by stripping out information based on programmed criteria (e.g., by identifying and stripping out information that is repeatedly included in multiple different RDS signals such as, for example, station names, station identifiers, advertising etc.). As another example, the queries 270, 275, 280 may comprise, respectively, the entirety of the received RDS data 215, 225, 245. These queries 270, 275, 280 are provided to a user preference database 80. If the information contained in one or more of the queries 270, 275, 280 matches information stored in the user preference database 80, then the matching information (or some or all of the RDS data for the channel for which the match was identified) is sent to the display 75. In the embodiment of FIG. 4, RDS data that does not match data stored in the user preference database is not provided to the display 75.

FIG. 5 is block diagram of a user preference database 300 according to certain embodiments of the present invention. As shown in FIG. 5, the user preference database 300 may include data for more than one user. The database 300 as illustrated includes data for three separate users in areas 305, 330 and 355. Multiuser user preference databases 300 may be particularly useful for broadcast media receiver and playback devices which are routinely used by multiple individuals, such as televisions or automobile radios. As shown in FIG. 5, listings of preferred songs 310, 335, 360 and/or preferred artists 315, 340, 365 may be kept for each user. In addition, lists of disfavored songs 320, 345, 370 and/or disfavored artists 325, 350, 375 may also optionally be kept. The disfavored song 320, 345, 370 and disfavored artist 325, 350, 375 lists may, for example, be used to identify off-channel RDS data that should not be displayed to a user. In further embodiments of the present invention, "trend" data may be kept with respect to each channel that is tracked. This trend data may comprise, for example, data regarding the number of songs (or other programming) over a given time period that are favored or disfavored as designated in the user preference database 300. This trend data may be used, for example, to determine channels that are playing a high percentage of disfavored content and/or channels that are playing a low percentage of favored content. Such a determination may be used to periodically remove channels from the list of channels that are scanned for RDS data.

Figure 6:
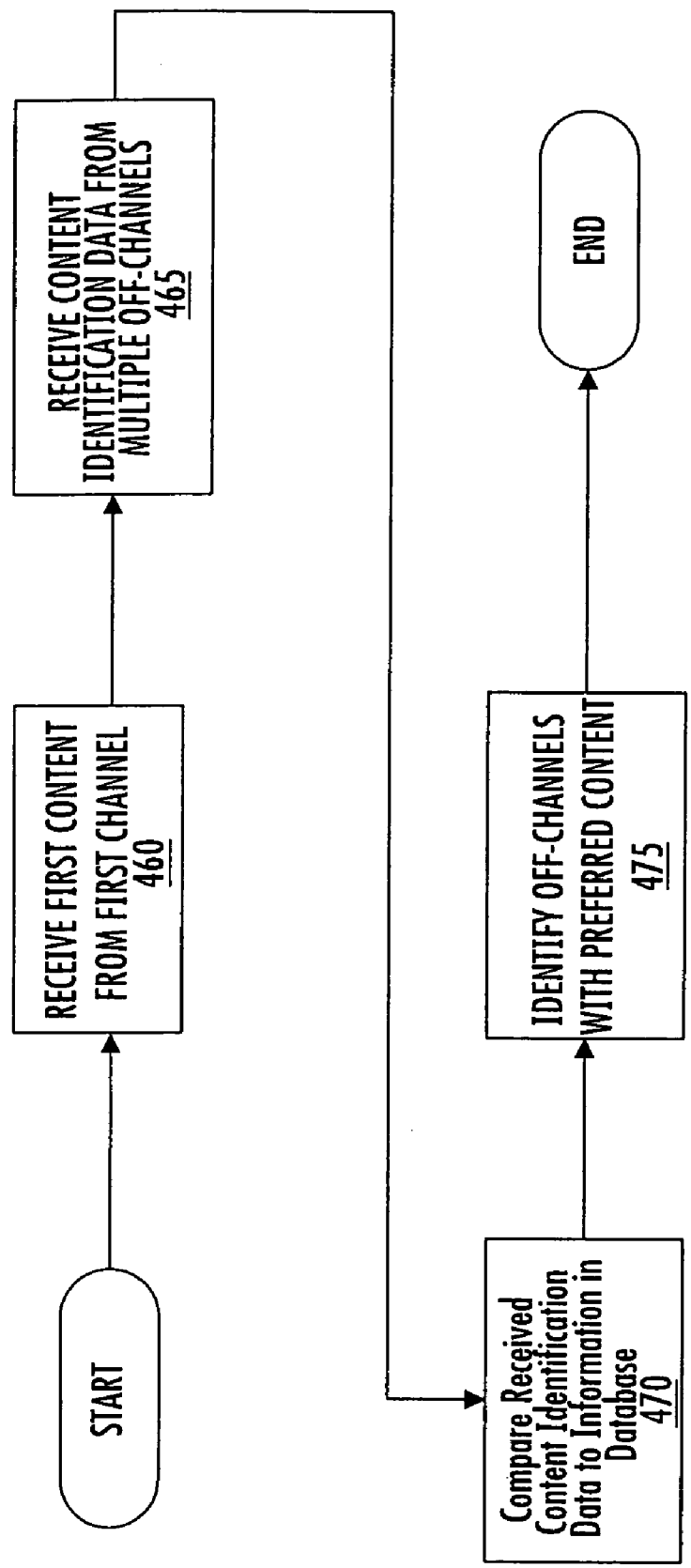
FIG. 6 is a flow chart illustrating methods of identifying preferred broadcast media content to a user according to certain embodiments of the present invention.

Pursuant to further embodiments of the present invention, methods of identifying preferred broadcast media content are provided. FIG. 6 is a flowchart illustration of certain of these methods. As shown in FIG. 6, pursuant to these methods, first content is received from a first channel (block 460). Content identification data is likewise received from a plurality of off-channels (block 465). Then, a series of comparisons are made that compare the received content identification data to information contained in a user preference database (block 470). Based on these comparisons, off-channels on which preferred content is currently playing may be identified (block 475).

In certain embodiments, the broadcast media receiver and playback device may automatically switch to an off-channel broadcast upon determining that the off-channel is currently playing preferred content. In such methods, content identification data may be collected for a plurality of channels using, for example, a secondary receiver that serially receives information regarding the content being played on the plurality of off-channels. This information may be compared with information stored in a user preference database. When a determination is made that content that is currently playing on one of the off-channels is content that the user preference database indicates is preferred content, the frequency or some other identifier of the off-channel playing the preferred content may be sent to the processor of the broadcast media receiver and playback device. The processor may then tune the primary receiver to the identified channel, thereby implementing the automatic switch to the channel playing the preferred content. Additional functionality may also be provided so that the primary receiver will not repeatedly switch between two channels playing content that is identified as preferred content. For example, such functionality might disable the automatic switching feature whenever a determination is made that the content currently being played to the user comprises preferred content. Resolution algorithms may also be provided to resolve conflicts in the identified preferred content. For example, a serially scan of the off-channels identifies a song playing on a first off-channel that has a user designated "song" preference of "8", and identifies a song playing on a second off-channel that is by an artist that has a user designated "artist" preference of "8" (i.e., the same value). An exemplary conflict resolution algorithm that could be used to resolve this situation might prefer the "song" preference over the "artist" preference (or vice versa) to resolve such potential conflicts.

In additional embodiments of the present invention, the secondary receiver (i.e., the receiver or receivers that scan(s) the off-channel RDS data) may be active even when the radio is not in use (i.e., the radio is not playing content to the user). Upon identifying that a channel is currently playing content that may be of particular interest to the user, the device can notify the user (e.g., via an audible alert) that such content is available and/or switch on the device in response to identification of such content.

Pursuant to still further embodiments of the present invention, the user can specify a select list of channels, and can activate a function whereby the radio will cycle through this select list, only tuning to channels that are currently broadcasting a particular type of programming. In some embodiments, the channels that are set into the pre-set tuning buttons may comprise this select list of channels. As an example of one FM radio implementation of such an embodiment, when the on-channel stops playing music (e.g., to switch to news, dialog, a commercial break, etc.), the FM radio detects this change and automatically tunes the primary receiver to the channel corresponding to one of the pre-set tuning buttons that is currently playing music. A variety of different algorithms could be used to determine which off-channel is selected. For example, in some embodiments, the FM radio will switch to the off-channel that most recently started playing a song. In other embodiments, the radio might look to the user preference database and attempt to identify, based on the RDS data and the information in the database, the off-channel that is most likely to be playing music that is of particular interest to the user. In further embodiments, other aspects of the content identification data could be used such as, for example, the music/talk flag that may be transmitted as part of the RDS data (i.e., one of the off-channels that the music/talk flag indicated was playing music would be selected). In still other embodiments, the user could rank the channels in the select list of off-channels (e.g., pre-set channel 1 is the highest ranked channel, pre-set channel 2 is the second most highly ranked channel, etc.), and switch to the most highly ranked of the select list of off-channels that is currently playing music. Note that herein the term "highly ranked" means that a channel is more preferred, regardless of the particular numbering convention used to reflect the rankings. Numerous other algorithms could also be used.

In additional embodiments of the present invention, the content identification data may be used to enhance the functionality of the pre-set tuning buttons. Once again turning to the FM radio example, the pre-set tuning buttons could have associated lights, display or other indicia that could be activated to provide information regarding the current content on the channel to which the pre-set tuning button is programmed. By way of example, lighted pre-set tuning buttons could be provided, and the content identification data (such as, for example, the music/talk flag in RDS data) collected via the secondary receiver discussed above could be used to keep track as to whether music or other programming is currently playing on the respective channel associated with each pre-set tuning button. If the channel is playing music, the pre-set tuning button could, for example, be lit, whereas if the channel is not playing music, the light in the pre-set tuning button could be turned off. It will be appreciated that other criteria (e.g., commercial or not a commercial) could be used to determine whether or not to light each pre-set tuning button.

In still further embodiments of the present invention, the device may include recording capabilities. For instance, with respect to the FM radio example discussed above, the FM radio may also include a recorder that can record music onto a tape, into flash memory, onto a CD, etc. In some embodiments of the present invention, the device may be programmed to tune to a channel and then record certain songs or other programming that is playing on that channel when the second receiver determines that preferred programming is starting on one of the monitored channels (i.e., on the on-channel or on any of the off-channels). In embodiments of the present invention in which the second receiver can both receive the off-channel content identification data and the programming on an off-channel, the content on an off-channel may be recorded without tuning the primary receiver to the off-channel. In still further embodiments of the present invention, previously recorded content may be played when no favored content is currently playing on any of the channels for which off-channel content identification data is tracked.

In still other embodiments of the present invention, the "seek" and/or "scan" features on the radio or other broadcast media receiver/player may be enhanced by coupling their functionality with information obtained by the receiver or receivers that receive and process off-channel content identification data. By way of example, in the FM radio example discussed above, the secondary RDS receiver could be programmed to obtain RDS data on every off-channel (or, alternatively, a subset of the off-channels based, for example, on signal strength or pre-selection by the user). As is well known in the art, the "seek" feature on a digital FM radio receiver scans to the next highest or the next lowest (depending upon which of two buttons the user presses) channel from the on-channel that meets certain signal strength or quality of reception requirements (which requirement, in some cases, is whether the FM receiver can lock onto the signal on the channel). The "scan" function likewise scans to the next highest or the next lowest channel (depending upon which of two buttons the user presses), but only plays the content of the channel for a short period of time (e.g., 1-3 seconds) before scanning again to the next channel. According to embodiments of the present invention, the "seek" and/or "scan" functions could be enhanced by using the off-channel RDS data and, optionally, the information in the user preferences database so that during the scans associated with the "seek" and "scan" functions only channels playing certain types of programming (e.g., only channels that are currently playing music) are stopped on during the "seek" or "scan." In this way, the user can, for example, avoid stopping on channels that are playing commercials when using the "seek" or "scan" functions on the radio.

In still further embodiments of the present invention, off-channel RDS scanning, combined with analysis of a user preferences database, can assist a mobile user in identifying likely preferred channels when traveling to a new location. By way of example, when a user travels in a car to a new location, the user often will have little or no information regarding radio stations that play content that the user is likely to prefer. According to certain embodiments of the present invention, off-channel RDS data may be used to identify the channels that correlate the most highly with information stored in the user preferences database regarding the user's preferred content and/or listening habits. This information may then be used to improve the user's listening experience. By way of example, in some embodiments of the present invention, the user could implement a function (e.g., by pushing a button on the radio) which programs the radio to perform the above-described correlation and then temporarily set the pre-set tuning buttons on the radio to the channels that are identified as correlating most highly with the user's preferences. The device could also be programmed to update this information by performing periodic correlations, as the identified channels may change as channels come into or fall out of reception and/or as more information is gathered about the content of particular stations (i.e., as time passes, each channel plays additional content, which may strengthen or weaken the correlation with the user's preferences as recorded in the user preferences database).

In still further embodiments of the present invention, "genre" information may be used instead of favored content (e.g., favored songs, favored artists, etc.) to identify likely preferred channels when a user travels to a new location. By way of example, the RDS system includes "PTY codes" in the RDS data stream. In the United States, PTY code 5 is assigned to rock music. Other PTY codes are assigned to other types or "genre" of music/programming. Currently, there are a total of 32 PTY codes in the RDS standard. Pursuant to certain embodiments of the present invention, a user may select one or more PTY codes as preferred PTY codes. When the user travels to a new location, the user may initiate a function that scans the PTY codes in the off-channel content identification data for all of the off-channels (or for all of the off-channels that meet specified signal strength or other performance criteria), and then set the pre-set tuning buttons on the radio to channels that have the user's preferred PTY codes. The user may rank the various PTY codes, and the pre-set tuning buttons may be populated based on these rankings. In certain embodiments, consideration of both the PTY codes and an analysis of the specific content played on the off-channels over some period of time may be combined to determine the channels to which the pre-set tuning buttons are tuned.

Figure 7:
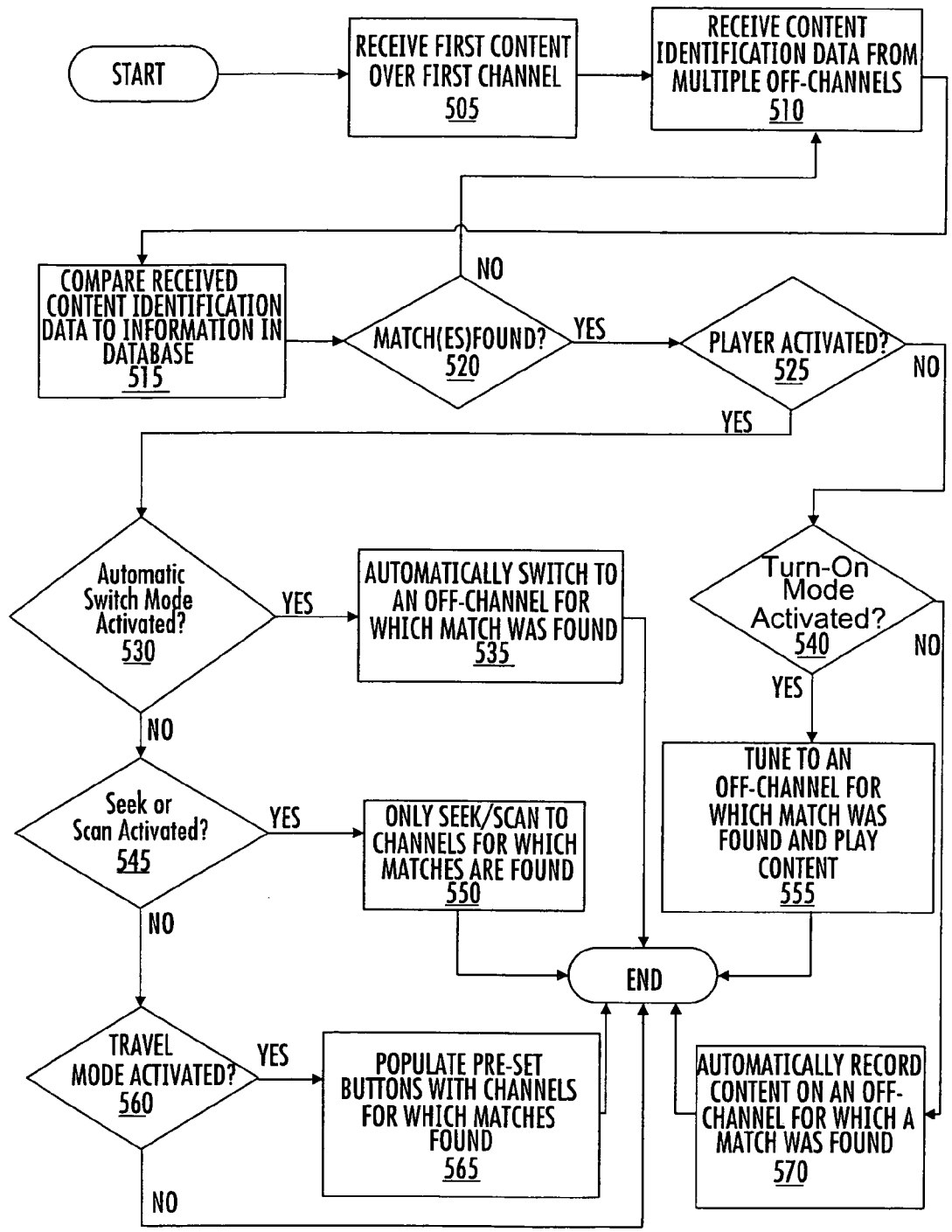
FIG. 7 is a flow chart illustrating methods of identifying preferred broadcast media content to a user according to further embodiments of the present invention.

FIG. 7 is a flowchart illustrating various methods according to some embodiments of the present invention that compare off-channel content identification data to information in a user preference database to enhance a user's broadcast media playing experience. Pursuant to these methods, first content is received from a first channel (block 505). At the same time, information regarding the content (i.e., "content identification data") playing on a plurality of other off-channels is likewise received (block 510). A comparison is then performed between at least some of the received content identification data and information stored in a user preference database (block 515). If no matches are found as a result of this comparison (block 520), operations may continue at block 510. If one or more matches are found at block 520, a variety of different operations may take place.

In particular, as shown at block 525, if the broadcast media receiver and playback device is not currently playing (e.g., an FM radio is not playing the content of any received channel), two different options, discussed above, may be activated. First, as shown at block 555, the device may tune to an off-channel for which a match was found at block 520 and play the content to the user in response to a "turn-on" mode being activated at block 540. In other cases, the device may be programmed to automatically record the content on an off-channel for which a match was found at block 520 (see block 570).

If the broadcast media receiver and playback device is currently playing the first content, the operations may again depend upon which modes of the device are activated. As shown at block 530, if an "automatic switch" mode is activated, the device may automatically switch to an off-channel for which a match was found (block 535). If not (block 530), and if the user activates a seek or scan function (block 545), the device may perform the enhanced seek/scan functionality discussed above, as indicated at block 550. As shown at blocks 560 and 565, the device may also use the information developed at blocks 515 and 520 regarding the channels that are playing content that match information stored in the user preferences database to activate the travel mode (block 560), discussed above, whereby a user can populate the pre-set tuning buttons on a broadcast media receiver and playback device automatically (block 565). It will be appreciated that FIG. 7 is provided to show one exemplary manner in which the functionality of the present invention could be implemented, and that numerous other implementation are likewise possible.

Pursuant to still further embodiments of the present invention, the user preference database may in whole or part be generated based on a user's channel selections. By way of example, a processor included within a broadcast media receiver and playback device can track instances when a user selects a channel and then proceeds to listen to the channel for a period of time. For instance, when a user activates a pre-set tuning button or a "seek" or "scan" button on an FM radio to change to a different channel, the processor can identify the content that was playing on the next channel that the user tunes into for some minimum amount of time. In this manner, the processor may identify both content that the user did not appear to prefer (i.e., content that the user relatively quickly switched to another channel) and content that the user appears to prefer (i.e., content on a channel that the user remained listening to). The algorithm for determining the user's preference could be based solely on the content playing at the time the user switches between channels, or could also be based on all of the content that the user listens to (i.e., it would consider all the content played on an on-channel for the period of time that the user was tuned to the channel, not just the content playing at the time the user switched to the channel). In this fashion, the user preferences database could be populated with information regarding the songs, artists and other programming that are preferred by the user.

As was noted above with respect to FIG. 5, in some embodiments of the present invention, information regarding programming that the user appears to not prefer may also be recorded in the user preference's database. This information could be used to further refine decisions regarding which channels to switch to and/or what information to include on a display of off-channel information. For example, if a user repeatedly switches stations when a certain song or songs by a certain artist are played, the song and/or artist in question could be identified in the user preferences database as a song/artist in which the user has little interest. In order to reduce the amount of information displayed to the user, when the off-channel RDS data scan identifies channels playing the song or artist at issue, the off-channel at issue may be removed from the display. In this fashion, the user preferences database may be used to provide a more focused display of relevant information to the user. In a similar fashion, off-channels that are playing commercials could likewise be identified via the RDS data and removed from the display until after the commercial ends. This functionality could also be combined with the automatic switching functionality, discussed above, so that the radio automatically switches to a new channel upon identifying that disfavored content is about to be played on the channel to which the primary receiver is currently tuned.

In still further embodiments of the present invention, the user preference database could be populated with commercially generated information that provides correlations between different types of programming. For example, commercial providers could generate data on additional songs/artists that a user is likely to prefer based on known preference with respect to other songs or artists. This commercially generated information could also be considered in correlations made between the off-channel RDS data and the user preferences database to identify channels playing content that the user is likely to prefer. This may be particularly helpful in identifying, for example, new songs that a user is likely to prefer based on a user's prior listening habits.

As noted above, a user may also manually populate some or all of the information in the user preference database. This could be done, for example, by downloading a file containing a user's preferred content that a user created, for example, on a computer. In other embodiments, an input mechanism (e.g., a button) may be provided that allows a user to identify content as preferred content while it is playing. This provides a convenient mechanism for a user to populate the user preferences database over time. Input mechanisms may likewise be provided that allow a user to identify content that is not (or that is no longer) preferred in a similar fashion. This function may be particularly useful as a user may over time tire of certain programming and thus want to reduce the frequency at which such content is played.

In certain of the above embodiments of the present invention, the user may not only identify preferred content, but may also rank or rate it. By way of example, in the embodiments where the user populates the user preference database by downloading a file from a computer, the user may rank each of the items in the file (i.e., on a scale of 1 to 10 or 1 to 5, etc.) instead of simply identifying each item as preferred or disfavored (or perhaps neutral) content. Ranking/rating schemes could also be used in the other embodiments discussed above. Such rankings may allow the device to resolve conflicts when more than one off-channel is identified as playing preferred content of the user by selecting the off-channel content to display, record, switch to etc. based on the relative rankings specified by the user.

In still further embodiments of the present invention, a secondary database may be implemented that stores content identification data for specified channels. The data stored might, for example, include song names, artists, channel information, etc. The user may use this information as a way of populating the user preference database. For example, the information in the second database could be displayed to the user, and the user could use one or more input devices (e.g., buttons on a radio) to identify each entry in the database as preferred content, neutral content or disfavored content, or to assign rankings to each entry. These rankings/ratings would then be transferred to the user preferences database so as to populate the user preference database with content that is ranked or rated in some manner.

Entries in a user preference database (e.g., preferred songs, artists, etc.) residing on one device can be loaded into a user preference database resident on another device. By way of example, the broadcast media receiver and playback device may be implemented in a cellular telephone that includes Bluetooth capabilities or other wired or wireless data transfer functionality. The user may also own a second cellular telephone that includes a broadcast media receiver and playback device according to embodiments of the present invention. The user may use the Bluetooth or other wired/wireless data connection functionality to populate a user preferences database in one of these cellular telephones from the user preference database in the other cellular telephone. Such a loading technique could similarly be used with, for example, car radios that include Bluetooth capabilities or any other broadcast media receiver and playback device that includes wired or wireless data transfer capabilities.

FIG. 8 is schematic diagram of a user interface for an FM radio receiver according to one exemplary embodiment of the present invention. As shown in FIG. 8, the user interface includes a primary display 405 and an off-channel RDS data display 445. The primary display 405 in this embodiment lists the frequency of the channel that the radio is currently playing (101.5 MHz), any pre-set tuning button corresponding to this channel (in this case, pre-set tuning button 2), the name of the song currently playing and the artist/group that recorded the song. The off-channel RDS data display 445 in this particular embodiment lists the programming currently playing on each of the channels corresponding to the remaining pre-set tuning buttons. As shown in FIG. 8, the information in the off-channel RDS data display for the channel corresponding to pre-set tuning button 3 is highlighted to indicate that this particular content is preferred content based on a comparison of the content with the user's preferences as recorded in a user preference database. The user interface also includes a plurality of pre-set tuning buttons 410, volume buttons 415 and seek/scan control buttons 420.

The user interface 400 may further include a plurality of function buttons or controls such as, for example, the control buttons 425, 430, 435, 440 shown in FIG. 8. The mode button 425 may be used, for example, to toggle between various operating modes that have generally been discussed above, such as the enhanced seek/scan function, a mode for setting the pre-set tuning buttons based on correlations between received content identification data and a user preference database, etc. The user button 435 may be used to specify which of multiple users is listening to the radio, so that the proper fields of a multi-user user preference database may be used. The add 430 and delete 440 buttons may be activated by a user to populate the user preference database with information regarding a user's preferences or to remove information from the database.

While many of the specific examples of embodiments of the present invention are described in terms of implementations in an FM radio broadcast media system, it will be understood that the concepts disclosed herein can be implemented in a variety of different broadcast media, and that the concepts are not limited to FM radio implementations. By way of example, each of the concepts described herein with respect to specific FM radio implementations could be implemented in AM radio or satellite radio in a virtually identical fashion, except that the mechanisms used to obtain the off-channel content information data would need to be appropriately modified.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of classifying content on at least some of the channels of a multi-channel broadcast a media system, the method comprising:
    identifying preferred and disfavored content of a user;
    populating a database with information regarding the preferred and disfavored content of the user;
    receiving at a first receiver first content from a first channel during a first time period;
    receiving information regarding the content available on a plurality of additional channels of the multi-channel broadcast media system during the first time period;
    automatically comparing the received information regarding the content available on the plurality of additional channels to the information in the database to identify one of the plurality of additional channels as having preferred content of the user;
    comparing the first content with the information in the database to identify the first content as disfavored content; and
    automatically tuning the first receiver to the identified channel at least partly in response to identifying the first content as disfavored content.

2. The method of claim 1, the method further comprising automatically recording the content on the identified channel.

3. The method of claim 1, wherein the first receiver comprises an FM radio receiver and wherein the information regarding the content available on the plurality of additional channels comprises RDS data associated with each of the plurality of additional channels.

4. The method of claim 1, wherein the plurality of additional channels consists only of the channels of the multi-channel broadcast media system other than the first channel for which a pre-set tuning bun has been set.

5. The method of claim 1, wherein the database of information is generated by the user identifying at least some of the received information regarding the content on each of the plurality of additional channels as preferred content.

6. The method of claim 1, further comprising at least partially populating the database of information by entering data into the database of information via a user interface.

7. The method of claim 1, further comprising at least partially populating the database of information by loading data from a second database of information into the database of information.

8. The method of claim 1, further comprising ranking the preferred content that is in the database of information, wherein the identified channel comprises the one of the plurality of additional channels having the most highly ranked content available thereon.

9. The method of claim 1, wherein the user pre-selects the plurality of additional channels for which information regarding the available content is received.

10. The method of claim 9, wherein the user pre-selects the plurality of additional channels for which information regarding the available content is received by entering a frequency of each of the plurality of additional channels.

11. The method of claim 9, wherein the user pre-selects the plurality of additional channels for which information regarding the available content is received by assigning a respective one of a plurality of pre-set tuning buttons to each of the plurality of additional channels.

12. The method of claim 1, wherein the plurality of additional channels for which information regarding the available content is received comprises channels of the multi-channel broadcast system that have a received signal strength that is greater than a pre-determined value.

13. The method of claim 1, wherein the database of information includes trend data regarding an amount of favored content that has been available over a period of time on at least some of the channels of the multi-channel broadcast system.

\* \* \* \* \*

UNITED STATES PATENT AND TRADEMARK OFFICE
CERTIFICATE OF CORRECTION

PATENT NO. : 7,643,807 B2
APPLICATION NO. : 11/300972
DATED : January 5, 2010
INVENTOR(S) : Gupta et al.

Page 1 of 1

It is certified that error appears in the above-identified patent and that said Letters Patent is hereby corrected as shown below:

Column 18, Claim 1, Line 31: Please delete "a" in "broadcast a media"

Column 18, Claim 4, Line 63: Please correct "bun" to read -- button --

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,643,807 B2
APPLICATION NO. : 11/300972
DATED : January 5, 2010
INVENTOR(S) : Gupta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Sixteenth Day of November, 2010

David J. Kappos
*Director of the United States Patent and Trademark Office*